(12) United States Patent
Takeuchi

(10) Patent No.: US 11,442,671 B2
(45) Date of Patent: Sep. 13, 2022

(54) INFORMATION PROCESSING APPARATUS PERFORMING NOTIFICATION ABOUT COMMUNICATION ERROR CAUSING COMMUNICATION VIA EXTERNAL APPARATUS TO BE INEXECUTABLE, CONTROL METHOD, AND STORAGE MEDIUM FOR THE SAME

(71) Applicant: CANON KABUSHIKI KAISHA, Tokyo (JP)

(72) Inventor: Takuya Takeuchi, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/932,578

(22) Filed: Jul. 17, 2020

(65) Prior Publication Data

US 2021/0034306 A1 Feb. 4, 2021

(30) Foreign Application Priority Data

Jul. 29, 2019 (JP) .............................. JP2019-139167

(51) Int. Cl.
*G06F 3/12* (2006.01)
*H04N 1/00* (2006.01)
*H04W 4/80* (2018.01)

(52) U.S. Cl.
CPC ............ *G06F 3/121* (2013.01); *G06F 3/1234* (2013.01); *G06F 3/1292* (2013.01); *H04N 1/0044* (2013.01); *H04N 1/00464* (2013.01); *H04W 4/80* (2018.02)

(58) Field of Classification Search
CPC ...... G06F 3/121; G06F 3/1222; G06F 3/1234; G06F 3/1231; G06F 3/1238; G06F 3/1292; G06F 3/1236; H04N 1/0044; H04N 1/00464; H04N 2201/0082; H04N 2201/0036; H04N 2201/0055; H04N 1/00238; H04N 1/00944; H04N 5/3577; H04W 4/80; H04W 24/00; H04W 76/00; H04W 12/06; H04W 48/08; H04W 76/10; H04W 8/005; H04W 88/06; H04W 84/12; H04W 48/16; H04L 63/0428

See application file for complete search history.

(56) References Cited

U.S. PATENT DOCUMENTS

| | | | |
|---|---|---|---|
| 2016/0088663 A1* | 3/2016 | Ishihara | H04W 76/12 370/252 |
| 2016/0291851 A1* | 10/2016 | Tomono | H04N 1/00411 |
| 2017/0099570 A1* | 4/2017 | Yamada | H04W 76/18 |
| 2017/0290071 A1* | 10/2017 | Ito | H04W 76/19 |
| 2018/0285025 A1* | 10/2018 | Mizutani | G06F 3/1292 |
| 2019/0268955 A1* | 8/2019 | Ikeda | H04W 76/14 |
| 2019/0335519 A1* | 10/2019 | Ohkubo | H04W 76/14 |

FOREIGN PATENT DOCUMENTS

JP 2013-162382 A 8/2013

* cited by examiner

*Primary Examiner* — Juan M Guillermety
(74) *Attorney, Agent, or Firm* — Canon U.S.A., Inc. I.P. Division

(57) ABSTRACT

A method includes performing notification processing to, in a case where a communication between a communication apparatus and an information processing apparatus via an external apparatus is to be inexecutable, notify a user of at least one of a communication error as the cause of failure to perform communication between the communication apparatus and the information processing apparatus via the external apparatus, and or a method for solving the communication error.

26 Claims, 10 Drawing Sheets

701 STATUS CODE ACQUISITION

LONG-PRESS PRINTER BUTTON SHOWN BELOW FOR THREE SECONDS.
AFTER DETECTION OF PRINTER, SCREEN WILL AUTOMATICALLY CHANGE.
WAIT FOR SECONDS.

702 CANCEL

INFORMATION PROCESSING APPARATUS PERFORMING NOTIFICATION ABOUT COMMUNICATION ERROR CAUSING COMMUNICATION VIA EXTERNAL APPARATUS TO BE INEXECUTABLE, CONTROL METHOD, AND STORAGE MEDIUM FOR THE SAME

BACKGROUND

Field

The present disclosure relates to communication in a computer network.

Description of the Related Art

There is known an information processing apparatus that transmits information about an external apparatus, such as a wireless local area network (LAN) router, to a communication apparatus to perform connection setting processing on the communication apparatus (Japanese Patent Application Laid-Open No. 2013-162382).

However, even after the information about the external apparatus has been transmitted to the communication apparatus, the communication between the communication apparatus and the information processing apparatus via the external apparatus may fail to be performed. In this case, it is desirable for the user to be able to identify the cause of failure to perform communication between the communication apparatus and the information processing apparatus via the external apparatus and then takes measures to solve the cause of the failure.

SUMMARY

In a case of a failure to perform communication between a communication apparatus and an information processing apparatus via an external apparatus, even after information about the external apparatus has been transmitted to the communication apparatus, various embodiments of the present disclosure enable a user to recognize the cause of the failure and identify measures to be taken to solve the cause of the failure.

In various embodiments of the present disclosure, a control method is provided which causes a computer of an information processing apparatus communicating with a communication apparatus to perform processing including transmitting, to the communication apparatus, connection information for connection with an external apparatus outside the communication apparatus and outside the information processing apparatus, determining, based on transmission of the connection information, whether a communication between the communication apparatus and the information processing apparatus via the external apparatus is executable, and performing, in a case where the communication between the communication apparatus and the information processing apparatus via the external apparatus is determined to be inexecutable, notification processing to notify a user of at least one of a communication error causing the communication between the communication apparatus and the information processing apparatus via the external apparatus to be inexecutable, or a method for solving the communication error.

Further features will become apparent from the following description of exemplary embodiments with reference to the attached drawings.

DESCRIPTION OF THE EMBODIMENTS

Exemplary embodiments of the present disclosure will be described in detail below with reference to the accompanying drawings. The following exemplary embodiments do not limit the invention; nor does the ambit of the appended claims limit the invention. Not all of the combinations of the features described in the exemplary embodiment are indispensable to solutions for the invention.

A first exemplary embodiment will be described below. An information processing apparatus and a communication apparatus according to the present exemplary embodiment will be described below. According to the present exemplary embodiment, a personal computer (PC) is described as an example of an information processing apparatus. Information processing apparatuses applicable to embodiments of the present disclosure are not limited to PCs, and apparatuses capable of communicating with a communication apparatus (described below) are also applicable to embodiments of the present disclosure. Examples of applicable information processing apparatuses include digital cameras, mobile phones, smart phones, tablet terminals, and personal digital assistants (PDAs). Although, in the present exemplary embodiment, a multifunction printer (hereinafter referred to as an MFP) capable of offering copying, fax, and printing services is described as an example of a communication apparatus, the invention is not limited thereto. Various types of apparatuses capable of communicating with an information processing apparatus are applicable as the communication apparatus. In a case where the embodiments of the present disclosure are applied to a printer, examples of applicable printers include ink-jet printers, full color laser beam printers, and monochrome printers. Embodiments of the present disclosure are also applicable to copying machines, facsimile apparatuses, smart phones, mobile phones, PCs, tablet terminals, PDAs, digital cameras, music playback devices, storages, projectors, smart speakers, and other apparatuses capable of offering non-printing services. A smart speaker refers to an apparatus that instructs other apparatuses on the same network to perform processing according to the user's voice and notifies the user of information acquired through the network in response to the user's voice. Embodiments of the present disclosure are also applicable to single function printers (SFPs) having a single function.

System Configuration

Figure 1:
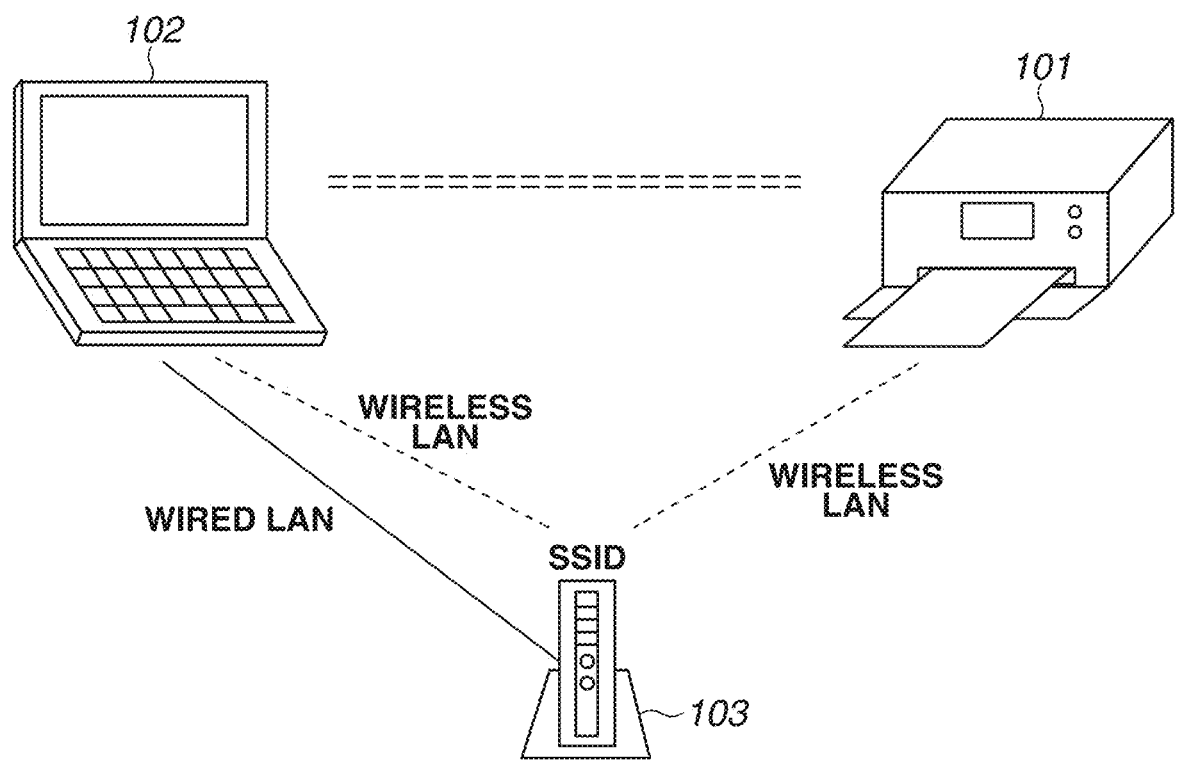
FIG. 1 illustrates a configuration of a communication system according to one embodiment.

FIG. 1 illustrates an example of a configuration of a communication system according to the present exemplary embodiment. An information processing apparatus 102 is an example of an information processing apparatus according to the present exemplary embodiment. A communication apparatus 101 is an example of a communication apparatus according to the present exemplary embodiment. An access point (AP) 103 is an external apparatus existing outside the information processing apparatus 102 and outside the communication apparatus 101. The external apparatus may be an apparatus that relays communication via other than an access point. More specifically, the AP 103 is, for example, a wireless local area network (LAN) router.

The information processing apparatus 102 and the communication apparatus 101 can be connected with the AP 103. The information processing apparatus 102 is capable of communicating with the communication apparatus 101 via the AP 103. A method in which a terminal apparatus and a communication apparatus connect with each other via an AP in such a manner is generally referred to as an infrastructure connection. The infrastructure connection allows building a network environment in which a plurality of devices can mutually communicates with each other. On the other hand, a method in which a terminal apparatus and a communication apparatus directly connect with each other (without an AP) is referred to as a direct connection.

According to the present exemplary embodiment, the infrastructure connection and the direct connection between the information processing apparatus 102 and the communication apparatus 101 are connections based on a communication method conforming to the Institute of Electrical and Electronics Engineers (IEEE) 802.11 series standard. More specifically, the communication method conforming to the IEEE 802.11 series standard is Wireless Fidelity (Wi-Fi®). The communication method used for each connection is not limited to this configuration, but may be, for example, Bluetooth® or Wi-Fi Aware™.

Figure 2:
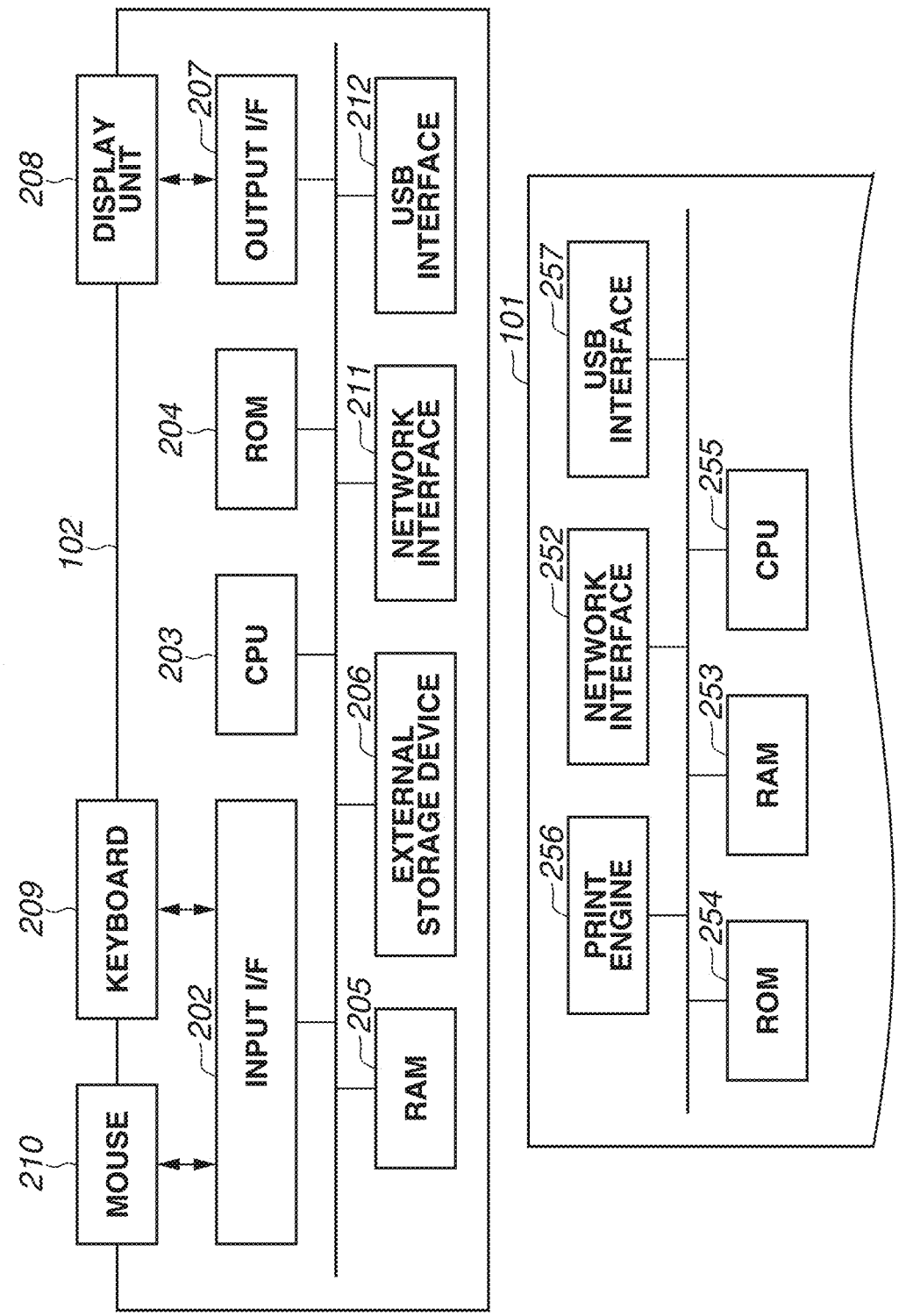
FIG. 2 illustrates hardware configurations of an information processing apparatus and a communication apparatus according to one embodiment.

Hardware configurations of the communication apparatus 101 and the information processing apparatus 102 will be described below with reference to FIG. 2.

The information processing apparatus 102 includes an input interface (I/F) 202, a central processing unit (CPU) 203, a read only memory (ROM) 204, a random access memory (RAM) 205, an external storage device 206, an output I/F 207, a display unit 208, a keyboard 209, and a mouse 210. The CPU 203, the ROM 204, and the RAM 205 form the computer of the information processing apparatus 102. The information processing apparatus 102 further includes a network interface (first communication unit) 211 and a universal serial bus (USB) interface (second communication unit) 212.

The input I/F 202 is an interface for inputting data and receiving an operation instruction from the user through operations using the mouse 210 and the keyboard 209.

The CPU 203 is a system control unit and also functions as a processor for controlling the entire information processing apparatus 102.

The ROM 204 stores fixed data including control programs to be executed by the CPU 203, data tables, and embedded operating system programs (hereinafter referred to as OS programs). According to the present exemplary embodiment, each control program stored in the ROM 204 performs software execution control such as scheduling, task switching, and interruption processing under control of the embedded OS stored in the ROM 204.

The RAM 205 includes a static random access memory (SRAM) that requires a backup power source. Since the data in the RAM 205 is retained by a primary cell (not illustrated) for data backup, important data such as program control variables can be stored without volatilization. The RAM 205 also includes a memory area for storing setting information for the information processing apparatus 102 and management data for the information processing apparatus 102. The RAM 205 is also used as the main memory and a work memory for the CPU 203.

The external storage device 206 stores an application for offering a printing execution function, and a print job generation program for generating a print job that can be interpreted by the communication apparatus 101. The external storage device 206 also stores various programs such as an information transmission/reception control program for transmitting and receiving data to/from the communication apparatus 101 connected via a network interface 211 and a USB interface 212. The external storage device 206 also stores various information to be used by these programs. The external storage device 206 also stores a setup program (described below).

An output I/F 207 is an interface for controlling the display unit 208 to display data and issue a notification of the status of the information processing apparatus 102.

The display unit 208 including light emitting diodes (LEDs) and a liquid crystal display (LCD) displays data and issues a notification of the status of the information processing apparatus 102. The information processing apparatus 102 may receive an input from the user via operation members, such as numerical input keys, a mode setting key, a determination key, a cancellation key, and a power key, provided on the display unit 208.

The network interface 211 controls communication processing for wireless communication and wired communication via a wired LAN cable. More specifically, the network interface 211 is configured to connect with the communication apparatus 101 and an external apparatus existing outside the information processing apparatus 102 and outside the communication apparatus 101 via a wireless or wired LAN to perform data communication. For example, the network interface 211 can be connected to an access point (not illustrated) in the communication apparatus 101. When the network interface 211 is connected to an access point in the communication apparatus 101, the information processing apparatus 102 and the communication apparatus 101 becomes able to communicate with each other. The network interface 211 may directly wirelessly communicate with the communication apparatus 101, or may communicate with the communication apparatus 101 via an external apparatus existing outside the information processing apparatus 102 and outside the communication apparatus 101. Examples of the external apparatus include an external access point, and an apparatus capable of relaying communication other than the access point. Although the IEEE 802.11 series standard (Wireless Fidelity (Wi-Fi®) is used in the present exemplary embodiment, Bluetooth (registered trademark), for example, is also usable. Examples of the wireless communication method include Wi-Fi® and Bluetooth®. Examples of the external access point include a router apparatus. According to the present exemplary embodiment, a connection method in which the information processing apparatus 102 and the communication apparatus 101 directly connect with each other without an external access point is referred to as a direct connection method. A connection method in which the information processing apparatus 102 and the communication apparatus 101 connect with each other via an external access point is referred to as an infrastructure connection method. The information processing apparatus 102 may have a plurality of network interfaces 211 to perform communication by using a plurality of communication methods. More specifically, the information processing apparatus 102 may include interfaces performing communication based on short-range wireless communication methods, such as Bluetooth Low Energy (BLE), Near Field Communication (NEC), and Wi-Fi Aware™. The information processing apparatus 102 does not necessarily need to have the network interface 211 for wireless communication. More specifically, the information processing apparatus 102 may have only, for example, the network interface 211 and the USB interface 212 (described below) for wired communication as interfaces for communicating with other apparatuses.

The USB interface 212 controls USB connection via a USB cable. More specifically, the USB interface 212 is configured to connect with the communication apparatus 101 and other apparatus, such as an external access point, via USB to perform data communication.

The communication apparatus 101 includes a network I/F (communication unit) 252, a RAM 253, a print engine 256, a ROM 254, a CPU 255, and a USB interface 257. The CPU 255, the RAM 253, and the ROM 254 form the computer of the communication apparatus 101.

The network interface 252 controls communication processing for wireless communication and wired communication via a wired local area network (LAN) cable. More specifically, the network interface 252 has an access point for connecting with an apparatus such as the information processing apparatus 102 as an access point inside the communication apparatus 101. The access point is connectable with the network interface 211 of the information processing apparatus 102. The network interface 252 may directly wirelessly communicate with the information processing apparatus 102 or communicate with the information processing apparatus 102 via an external access point. More specifically, the network interface 252 may operate not only as an access point but also as a slave unit to be connected to an external access point. Although the IEEE-802.11 series standard (Wi-Fi®) is used in the present exemplary embodiment, Bluetooth (registered trademark), for example, may also be utilized. The network interface 252 may include a hardware component that functions as an access point, and may operate as an access point by using software for causing the interface to operate as an access point. The communication apparatus 101 may include a plurality of network interfaces 252 to perform communication based on a plurality of communication methods. More specifically, the communication apparatus 101 may further include interfaces performing communication based on short-range wireless communication methods, such as BLE, NFC, and Wi-Fi Aware™.

The RAM 253 includes an SRAM that needs a backup power source. The RAM 253 stores data by using a primary battery (not illustrated) for data backup and therefore is capable of storing important data including program control variables without volatilization. The RAM 253 also includes a memory area for storing setting information for the communication apparatus 101 and management data for the communication apparatus 101. The RAM 253 is also used as the main memory and a work memory for the CPU 255, and serves as a receiving buffer for temporarily storing print information received from the information processing apparatus 102 and other various information.

The ROM 254 stores fixed data including control programs to be executed by the CPU 255, data tables, and OS programs. According to the present exemplary embodiment, each control program stored in the ROM 254 performs software execution control such as scheduling, task switching, and interruption processing under control of the embedded OS stored in the ROM 254.

The CPU 255 is a system control unit and also functions as a processor for controlling the entire communication apparatus 101.

Based on the information stored in the RAM 253 or a print job received from the information processing apparatus 102, a print engine 256 performs image forming processing for forming an image on a recording medium by applying a recording agent such as ink to the recording medium such as paper, and outputting the result of printing. A print job is a job for instructing the communication apparatus 101 to perform the image forming processing.

According to the present exemplary embodiment, the communication apparatus 101 uses at least either one of the 2.4 GHz and 5 GHz frequency bands for wireless connection based on the IEEE-802.11 series standard. The communication apparatus 101 has communication channels corresponding to available frequency bands. For example, if the 2.4 GHz frequency band is available, the communication apparatus 101 has 14 communication channels assigned to predetermined frequency bands in the 2.4 GHz frequency band. For example, if the 5 GHz frequency band is available, the communication apparatus 101 has 19 communication channels assigned to predetermined frequency bands in the 5 GHz frequency band.

Although the information processing apparatus 102 and the communication apparatus 101 share processing as described above as an example, the shared processing is not limited thereto, but other configurations of shared processing are also applicable.

Wi-Fi® Communication (Direct Connection Mode)

To establish a direct connection based on the Peer To Peer (P2P) connection mode in the Wi-Fi® communication, the communication apparatus 101 according to the present exemplary embodiment operates in the direct connection mode. As described above, the direct connection refers to a configuration in which apparatuses directly wirelessly connect with each other without an external apparatus such as the AP 103. The direct connection mode includes a software AP mode and a Wi-Fi Direct® (WFD) mode. The communication apparatus 101 operating in the direct connection mode serves as a master station in the network which the communication apparatus 101 belongs to. According to the present exemplary embodiment, a master station refers to an apparatus which builds a wireless network and provides a slave station with parameters to be used for connection to the wireless network. Examples of the parameters to be used for connection to the wireless network include parameters related to the communication channel used by the master station. When a slave station receives the parameters, the slave station connects to the wireless network built by the master station, by using the communication channel used by the master station.

WFD is a standard devised by Wi-Fi® Alliance. WFD enables the information processing apparatus 102 and the communication apparatus 101 that support WFD to directly wirelessly connect with each other without another AP. In particular, an apparatus that supports WFD and has a role of an AP (master station) is referred to as a group owner. A mode in which direct connection is executed based on WM is referred to as a WFD mode.

The communication apparatus 101 has a software AP function for enabling operation as an AP. The communication apparatus 101 enables (activates) a software AP inside the communication apparatus 101, and the information processing apparatus 102 is connected with the software AP not by WFD but by normal Wi-Fi®. This form of connection enables the information processing apparatus 102 and the communication apparatus 101 to directly wirelessly connect with each other without another AP. A mode in which the communication apparatus 101 operates by enabling the software AP inside the communication apparatus 101 to execute the direct connection is referred to as a software AP mode. When the software AP mode is stopped, the communication apparatus 101 disables the software AP inside the communication apparatus 101, so that the communication apparatus 101 becomes unable to directly connect with other apparatuses by using the software AP.

In the direct connection mode, the communication apparatus 101 operates as a master station and therefore can determine which communication channel is to be used for communication in the direct connection mode. For example, when the communication apparatus 101 concurrently operates in the infrastructure connection mode and the direct connection mode, the communication apparatus 101 performs control so that the communication channel used for communication in the infrastructure connection mode can also be used for communication in the direct connection mode. For example, the communication apparatus 101 may preferentially select the communication channel to be used for connection with the AP 103 over other channels as a channel to be used for communication in the direct connection mode.

Connection information (Service Set Identifier (SSID) and password) for connection with the communication apparatus 101 in the direct connection mode may be arbitrarily changed through a user operation on an operation unit included in the communication apparatus 101.

Wi-Fi® Communication (Infrastructure Connection Mode)

The communication apparatus 101 according to the present exemplary embodiment operates in the infrastructure connection mode to establish a connection (infrastructure connection) based on the infrastructure connection mode in the Wi-Fi® communication. According to the present exemplary embodiment, the infrastructure connection refers to a mode in which an external apparatus managing a network, such as the AP 103, operates as a master station and apparatuses are wirelessly connected to each other via the master station. The communication apparatus 101 operating in the infrastructure connection mode operates as a slave station in the network which the communication apparatus 101 belongs to.

In the infrastructure connection mode, the communication apparatus 101 and the information processing apparatus 102 are connected with each other via the AP 103, and communication between the apparatus 101 and the information processing apparatus 102 via the AP 103 is enabled. The channel used in communication in the infrastructure connection mode may be a frequency band other than 2.4 GHz (for example, 5.0-GHz band).

In order for the information processing apparatus 102 to communicate with the communication apparatus 101 via the AP 103, the information processing apparatus 102 needs to recognize that the communication apparatus 101 belongs to the network that is formed by the AP 103 and the information processing apparatus 102 belongs to. More specifically, the information processing apparatus 102 transmits a search signal on the network which the information processing apparatus 102 belongs to via the AP 103 and confirms communication with the communication apparatus 101.

According to the present exemplary embodiment, a state where the information processing apparatus 102 and the communication apparatus 101 are connected to the same AP is recognized as the infrastructure connection state. In other words, in the infrastructure connection state, the information processing apparatus 102 and the communication apparatus 101 need only be connected with the same AP and do not need to recognize that the partner apparatus belongs to the network which each of the apparatuses belong to.

According to the present exemplary embodiment, the communication apparatus 101 can concurrently establish a direct connection and an infrastructure connection. In other words, the communication apparatus 101 can establish a Wi-Fi®-based connection where the communication apparatus 101 serves as a slave device and a Wi-Fi®-based connection where the communication apparatus 101 serves as a master device in a parallel manner. An operation in a state where the above-described two connections are concurrently established is referred to as a simultaneous operation. To perform a simultaneous operation, the communication apparatus 101 causes the frequency band and communication channel to be used for the infrastructure connection to match the frequency band and communication channel to be used for the direct connection. According to the present exemplary embodiment, however, when the communication apparatus 101 uses the 5-GHz frequency band for the infrastructure connection, the communication apparatus 101 neither operates in the direct connection mode nor performs the simultaneous operation. This is because, when the 5-GHz frequency band is used, the used communication channel may possibly be changed by Dynamic Frequency Selection (DFS).

Connection Setting Processing

According to the present exemplary embodiment, the information processing apparatus 102 performs setting (connection setting) for operating the communication apparatus 101 in at least one of the infrastructure connection mode and the direct connection mode, through wireless communication with the communication apparatus 101. The connection setting processing according to the present exemplary embodiment is performed through wireless communication and therefore referred to as a cableless setup (CLS). The connection setting processing may be performed through wired communication.

The communication apparatus 101 performs the connection setting processing in a state where the communication apparatus 101 is operating in the connection setting mode as a mode for performing the connection setting processing. The connection setting mode will be described in detail below.

The information processing apparatus 102 performs the connection setting processing when a predetermined program stored in the RUM 204 and the external storage device 206 is being activated. The predetermined program is an application program for setting a connection destination AP for the communication apparatus 101 and instructing the communication apparatus 101 to print image data or document data in the information processing apparatus 102. Hereinafter, the predetermined program is referred to as a setup program. The setup program may have other functions than the function of setting a connection destination AP for the communication apparatus 101 and the printing function. For example, in a case where the communication apparatus 101 has a scan function, the setup program may include a function of scanning a set document, a function of performing other settings of the communication apparatus 101, and a function of confirming the status of the communication apparatus 101.

In a case where the information processing apparatus 102 causes the AP 103 and the communication apparatus 101 to be connected to each other and causes the communication apparatus 101 to operate in the infrastructure connection mode, the information processing apparatus 102 wirelessly transmits an infrastructure setting command for causing the communication apparatus 101 to operate in the infrastructure connection mode to the communication apparatus 101. The infrastructure setting command includes, for example, information about the AP 103. Examples of the information about the AP 103 include the information about the Service Set Identifier (SSID) of the AP 103, the password for connection with the AP 103, and the frequency band to be used by the AP 103.

On the other hand, to cause the communication apparatus 101 to operate in the direct connection mode, the information processing apparatus 102 wirelessly transmits a direct setting command for causing the communication apparatus 101 to operate in the direct connection mode to the communication apparatus 101. The direct setting command includes an instruction for enabling the WFD function for causing the communication apparatus 101 to operate as a group owner, and an instruction for enabling the AP inside the communication apparatus 101. The information processing apparatus 102 acquires connection information for the direct connection with the communication apparatus 101 from the communication apparatus 101. Examples of the connection information for the direct connection with the communication apparatus 101 include the SSID of the communication apparatus 101 and the password for connection with the communication apparatus 101.

According to the present exemplary embodiment, the direct connection for the connection setting between the information processing apparatus 102 and the communication apparatus 101 is used to transmit an infrastructure setting command and a direct setting command and acquire information for the direct connection with the communication apparatus 101 in the connection setting processing. According to the present exemplary embodiment, the Wi-Fi®-based connection and the BLE-based connection are usable as the direct connection for the connection setting. In other words, according to the present exemplary embodiment, the information processing apparatus 102 is capable of performing the Wi-Fi®-based connection setting processing and the BLE-based connection setting processing.

For example, a wireless communication method other than Wi-Fi® and BLE, such as Classic Bluetooth®, or a wired communication method, such as wired LAN and USB, may be used as direct connection for the connection setting.

After a Wi-Fi®-based infrastructure connection or direct connection is established between the information processing apparatus 102 and the communication apparatus 101 through the connection setting processing, the communication between the information processing apparatus 102 and the communication apparatus 101 via an established connection is enabled. Specifically, the information processing apparatus 102 can, for example, transmit a print job for instructing the communication apparatus 101 to perform printing and a scan job for instructing the communication apparatus 101 to perform scanning to the communication apparatus 101 via the established connection.

Connection Setting Mode

As described above, the communication apparatus 101 can operate in the connection setting mode. Examples of triggers causing the communication apparatus 101 to start operation in the connection setting mode include depression of a button for the connection setting mode by the user and activation (power ON) of the communication apparatus 101 for the first time after arrival. The button for the connection setting mode may be a hardware button provided in the communication apparatus 101 or a software button displayed on the display unit 208 of the communication apparatus 101.

When the communication apparatus 101 starts operation in the connection setting mode, both the Wi-Fi® communication and the BLE communication are enabled. Specifically, the communication apparatus 101 enables the AP (AP for connection setting) dedicated for the connection setting mode in the communication apparatus 101 in processing for enabling the Wi-Fi® communication. Thus, the communication apparatus 101 enters a state where a Wi-Fi®-based direct connection with the information processing apparatus 102 can be established. Connection information (SSID and password) for connection with the AP for connection setting is pre-stored in the setup program installed in the information processing apparatus 102. The information processing apparatus 102 recognizes in advance the connection information for connection with the AP for connection setting. Therefore, unlike the connection information for the AP enabled in the direct connection mode, the connection information for connection with the AP for connection setting cannot be arbitrarily changed by the user. In the connection setting mode, the communication apparatus 101 may connect with the information processing apparatus 102 not by normal Wi-Fi® but by WFD. Specifically, the communication apparatus 101 may operate as a group owner and receive a setting command from the information processing apparatus 102 through the WFD-based communication.

The communication apparatus 101 starts transmitting advertising information as processing for enabling the BLE communication. Thus, the communication apparatus 101 enters a state where the BLE-based connection with the information processing apparatus 102 can be established. According to the present exemplary embodiment, the communication apparatus 101 enters a state where a BLE-based pairing request can be received in a predetermined period after the BLE communication is enabled. Upon reception of a BLE-based pairing request in the predetermined period, the communication apparatus 101 performs pairing with the apparatus that is a pairing request transmission source to establish a BLE-based connection. If a BLE-based pairing request is not received in the predetermined period, the communication apparatus 101 may disable the BLE communication.

When the communication apparatus 101 enables both the Wi-Fi® communication and the BLE communication in the connection setting mode, the communication apparatus 101 receives a setting command through these communications and then performs processing corresponding to the received setting command.

Status Code Notification

As described above, according to the present exemplary embodiment, the information processing apparatus 102 connects the communication apparatus 101 to the AP 103 through the connection setting processing. More specifically, the information processing apparatus 102 transmits the information about the AP 103 through the direct connection between the information processing apparatus 102 and the communication apparatus 101. When the communication apparatus 101 receives the information about the AP 103, the communication apparatus 101 attempts a connection with the AP 103 based on the received information. When an attempt is made to establish a connection between the communication apparatus 101 and the AP 103, the direct connection between the information processing apparatus 102 and the communication apparatus 101 is once disconnected. Then, the information processing apparatus 102 is reconnected with the AP 103 that has been connected before performing the connection setting processing.

As described above, the communication apparatus 101 attempts to establish a connection between the communication apparatus 101 and the AP 103 based on the information received from the information processing apparatus 102. However, the communication between the communication apparatus 101 and the information processing apparatus 102 via the AP 103 may fail. Examples of a case of failure in the communication between the communication apparatus 101 and the information processing apparatus 102 via the AP 103 includes a case where an error occurs due to a connection failure between the communication apparatus 101 and the AP 103. Examples of a case of the connection failure between the communication apparatus 101 and the AP 103 include a case where the user incorrectly inputs the password (security key) for connection with the AP 103, thereby resulting in occurrence of an error due to wrong information about the AP 103 transmitted from the information processing apparatus 102 to the communication apparatus 101. Examples of the case also include a case where many noise radio waves are generated by apparatuses existing around the communication apparatus 101 and the AP 103. Examples of the case also include a case where the radio field intensity in the communication between the communication apparatus 101 and the AP 103 is low because the communication apparatus 101 and the AP 103 are separated too far, and there is an object disturbing the communication between the communication apparatus 101 and the AP 103, thereby resulting in occurrence of an error.

Examples of a case of the failure in the communication between the communication apparatus 101 and the information processing apparatus 102 via the AP 103 includes a case where the communication apparatus 101 and the information processing apparatus 102 are connected with respectively different APs 103. Examples of the case also include a case where, although the connection between the communication apparatus 101 and the AP 103 has been successfully established, a privacy separator function is set in the AP 103, and communication between terminals via the AP 103 is not permitted, which eventually results in occurrence of an error. Examples of the case also include a case where, although the connection between the communication apparatus 101 and the AP 103 has been successfully established, the radio field intensity in the communication between the communication apparatus 101 and the AP 103 is low, thereby resulting in occurrence of an error. Examples of the case also include a case where, although the connection between the communication apparatus 101 and the AP 103 has been successfully established, many noise radio waves are generated by apparatuses existing around the communication apparatus 101 and the AP 103, thereby resulting in occurrence of an error.

In a case where communication between the information processing apparatus 102 and the communication apparatus 101 cannot be executed even after the information processing apparatus 102 has performed the connection setting processing, various causes as described above can be considered.

As described above, in a case where communication between the information processing apparatus 102 and the communication apparatus 101 via the AP 103 cannot be executed even after the information processing apparatus 102 has performed the connection setting processing, the user needs to solve the communication error. However, it is difficult for the user to identify the cause of the communication error. According to the present exemplary embodiment, therefore, the information processing apparatus 102 displays a notification screen for notifying the user of a status code indicating the communication error disturbing the communication between the information processing apparatus 102 and the communication apparatus 101. The notification screen also includes an area for indicating a method for solving the communication error to the user.

To display the notification screen, the information processing apparatus 102 needs to acquire information about the cause (e.g., status code) from the communication apparatus 101. As described above, in a case where an attempt is made to establish a connection between the communication apparatus 101 and the AP 103, the direct connection between the information processing apparatus 102 and the communication apparatus 101 is once disconnected. Thus, after the transmission of the information about the AP 103, the information processing apparatus 102 is unable to acquire information about the cause from the communication apparatus 101. As a result, there arises a problem that the information processing apparatus 102 is unable to identify the cause of the failure in performing communication between the information processing apparatus 102 and the communication apparatus 101, which eventually prevents the information processing apparatus 102 from displaying a suitable notification screen.

According to the present exemplary embodiment, therefore, in a case where the communication between the information processing apparatus 102 and the communication apparatus 101 is inexecutable even after the information processing apparatus 102 has performed the connection setting processing, the information processing apparatus 102 re-establishes a direct connection with the communication apparatus 101. Then, the information processing apparatus 102 acquires information about the cause of the communication error via the re-established direct connection and notifies the user of the cause of the communication error and a method for solving the cause of the communication error.

Figure 3:
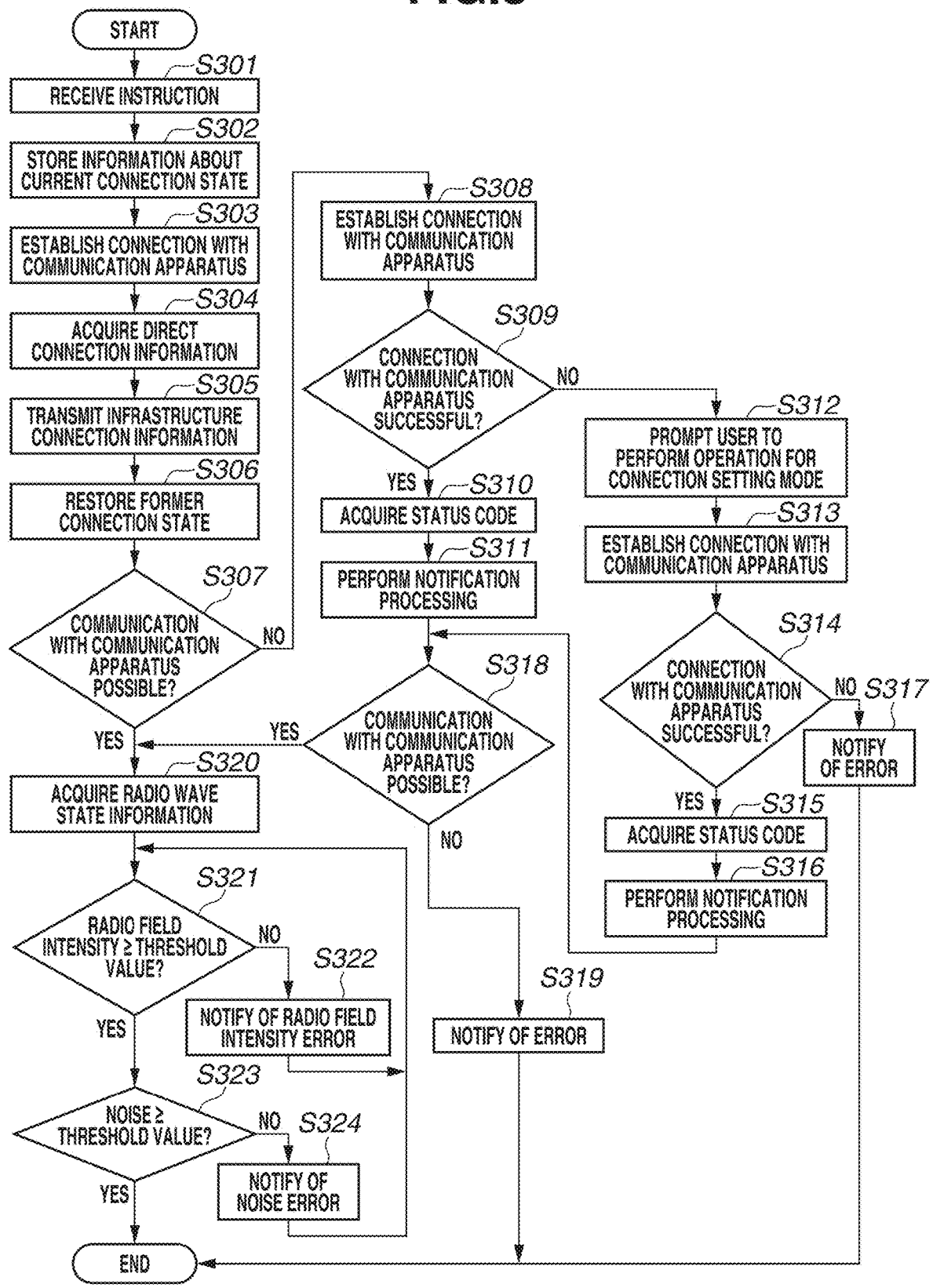
FIG. 3 is a flowchart illustrating connection setting processing performed by the information processing apparatus according to one embodiment.

Details of Connection Setting Processing According to Present Exemplary Embodiment FIG. 3 is a flowchart illustrating the connection setting processing performed by the information processing apparatus 102. Processing of this flowchart is implemented when the CPU 203 loads the setup program stored in the ROM 204 into the RAM 205 and then executes the program. A configuration for performing the connection setting processing through the Wi-Fi® communication will be described below with reference to the flowchart of FIG. 3.

In step S301, the CPU 203 receives an instruction for performing the connection setting processing by receiving an input to the screen displayed by the setup program from the user.

In step S302, the CPU 203 stores information about the current connection state of the information processing apparatus 102 (more specifically, information about the connection state when the information processing apparatus 102 receives the instruction for performing the connection setting processing) in a memory such as the ROM 204. If the information processing apparatus 102 is connected with any AP 103 at the time of reception of the instruction for performing the connection setting processing, the connection state information refers to information (SSID or password) about the AP 103 that the information processing apparatus 102 is connected with. If the information processing apparatus 102 is connected with none of the APs 103 at the time of reception of the instruction for performing the connection setting processing, the connection state information indicates that the information processing apparatus 102 is connected with none of the APs 103.

In step S303, the CPU 203 establishes a direct connection between the communication apparatus 101 operating in the connection setting mode and the information processing apparatus 102. In a case where the information processing apparatus 102 is connected with the AP 103, the CPU 203 disconnects the connection between the information processing apparatus 102 and the AP 103 and then establishes a direct connection between the communication apparatus 101 and the information processing apparatus 102. The communication between the communication apparatus 101 and the information processing apparatus 102 in steps S304 and S305 (described below) is performed through the established direct connection.

In step S304, the CPU 203 acquires various information from the communication apparatus 101. The information received at this time includes, for example, connection information (direct connection information) for directly connecting with the communication apparatus 101 operating in the direct connection mode. Specific examples of the direct connection information include the SSID and password of the software AP inside the communication apparatus 101. Examples of the information received at this time include identification information (Media Access Control (IAC) address and serial number) of the communication apparatus 101.

In step S305, the CPU 203 transmits connection information (infrastructure connection information) for operating the communication apparatus 101 in the infrastructure connection mode to the communication apparatus 101. Specific examples of the infrastructure connection information include the information about the AP 103 stored in step S302. The AP 103 here is an AP with which the information processing apparatus 102 is connected at the time of reception of the instruction for performing the connection setting processing. The infrastructure connection information is not limited to the above-described information. For example, the infrastructure connection information may be information about an AP 103 selected by the user from among a plurality of APs 103 existing around the information processing apparatus 102 and the communication apparatus 101. The information processing apparatus 102 and the communication apparatus 101 can find the plurality of APs 103 existing around them by searching for beacons transmitted from the APs 103. For example, the CPU 203 may acquire a list of the plurality of APs 103 existing around the communication apparatus 101 from the communication apparatus 101, and determine whether the list includes the AP 103 which the information processing apparatus 102 is connected with at the time of reception of the instruction for performing the connection setting processing. When the list includes the AP 103, the CPU 203 may transmit, as the infrastructure connection information, the information about the AP 103 which the information processing apparatus 102 is connected with at the time of reception of the instruction for performing the connection setting processing to the communication apparatus 101. On the other hand, when the list does not include the AP 103, the CPU 203 may transmit, as the infrastructure connection information, information about the AP 103 selected from the list by the user to the communication apparatus 101. In a case where the information processing apparatus 102 is not connected with the AP 103 at the time of reception of the instruction for performing the connection setting processing, the CPU 203 may transmit information about the AP 103 selected from the list by the user to the communication apparatus 101. Alternatively, the CPU 203 may receive an input of the information about the AP 103 specified by the user from the user and then transmit the received information to the communication apparatus 101. Yet alternatively, the CPU 203 may display a screen for receiving an input of the password of the AP 103, and include the password input from the user via the screen in the infrastructure connection information. In a case where the CPU 203 identifies the infrastructure connection information to be transmitted as described above, the CPU 203 may once cancel the connection between the information processing apparatus 102 and the communication apparatus 101 and then attempt to establish a connection between the information processing apparatus 102 and the AP 103 by using the infrastructure connection information to be transmitted. Then, in a case where the connection between the information processing apparatus 102 and the AP 103 has been successfully established, the CPU 203 may re-establish a connection between the information processing apparatus 102 and the communication apparatus 101 and then transmit the infrastructure connection information to the communication apparatus 101. In a case of failure to establish a connection between the information processing apparatus 102 and the AP 103, the CPU 203 may receive again an input of the information (particularly the password) about the AP 103. If an input is received again, the CPU 203 attempts to establish a connection between the information processing apparatus 102 and the AP 103 by using the re-input information. In a case where the connection has been successfully established, the CPU 203 transmits the infrastructure connection information to the communication apparatus 101.

In step S306, based on the connection state information stored in step S302, the CPU 203 restores the connection state of the information processing apparatus 102 to the state before the establishment of the direct connection between the communication apparatus 101 operating in the connection setting mode and the information processing apparatus 102. The configuration is not limited thereto. For example, based on the information about the AP 103 transmitted as the infrastructure connection information, the CPU 203 may connect the AP 103 corresponding to the information and the information processing apparatus 102.

Since the connection information is transmitted in step S305, if the connection setting based on the connection information is successfully completed in the communication apparatus 101, the information processing apparatus 102 is able to communicate with the communication apparatus 101. In step S307, the CPU 203 determines whether the communication with the communication apparatus 101 is executable based on the transmission of the connection information. More specifically, the CPU 203 transmits a broadcast for requesting a response on the network build by the AP 103 which the information processing apparatus 102 is connected with. Then, the CPU 203 receives a response to the broadcast and then determines whether the response includes the response transmitted from the communication apparatus 101 (a response including the identification information acquired in step S304). In a case where the response includes the response transmitted from the communication apparatus 101, the CPU 203 determines that the communication with the communication apparatus 101 is executable. On the other hand, in a case where the response does not include the response transmitted from the communication apparatus 101, the CPU 203 determines that the communication with the communication apparatus 101 is not executable. At this time, the CPU 203 may confirm whether communication with the communication apparatus 101 is executable on a network other than the Wi-Fi®-based network. More specifically, for example, in a case where the information processing apparatus 102 is connected to a network via a wired LAN, the CPU 203 may transmit a broadcast on the network which the information processing apparatus 102 is connected to via the wired LAN and then receive a response based on which the determination is to be made. When a response is received from the communication apparatus 101 via any one of the networks which the information processing apparatus 102 is connected to, the result of the determination is "YES". In a case where the CPU 203 determines that the communication with the communication apparatus 101 is executable (YES in step S307), the processing proceeds to step S320. On the other hand, in a case where the CPU 203 determines that the communication with the communication apparatus 101 is not executable (NO in step S307), the processing proceeds to step S308.

In step S308 to be performed when the result of the determination in step S307 is "NO", the CPU 203 attempts to establish a direct connection between the communication apparatus 101 operating in the direct connection mode and the information processing apparatus 102, by using the direct connection information acquired in step S304.

In step S309, the CPU 203 determines whether the direct connection attempted in step S308 has been successfully established. In a case where the CPU 203 determines that the direct connection attempted in step S308 has been successfully established (YES in step S309), the processing proceeds to step S310. On the other hand, in a case where the CPU 203 determines that the establishment of the direct connection attempted in step S308 has failed (NO in step S309), the processing proceeds to step S312. Examples of a case where the establishment of the direct connection attempted in step S308 fails include a case where the AP 103 which the communication apparatus 101 is connected with based on the infrastructure connection information transmitted in step S305 is an AP using the 5-GHz frequency band, and the communication apparatus 101 is not operating in the direct connection mode. Examples of the case also include a case where a setting for limiting the transition to the direct connection mode is made in the communication apparatus 101. In a case where the CPU 203 determines that the establishment of the direct connection attempted in step S308 has failed (NO in step S309), the processing may proceed to step S317 (described below). In other words, the CPU 203 may perform error notification processing without establishing a connection between the communication apparatus 101 operating in the connection setting mode and the information processing apparatus 102. When the direct connection attempted in step S308 has been successfully established, the communication between the communication apparatus 101 and the information processing apparatus 102 in step S310 (described below) is performed via the established direct connection.

In step S310 performed when the result of the determination in step S309 is "YES", the CPU 203 transmits a status code request to the communication apparatus 101 and then receives a status code from the communication apparatus 101. The status code refers to information about the cause of failure to perform communication between the information processing apparatus 102 and the communication apparatus 101 even after the communication of the infrastructure connection information has been performed. The status code is, for example, information about the state of the communication apparatus 101. According to the present exemplary embodiment, the following status codes exist. A status code c-0 is information indicating that the connection between the communication apparatus 101 and the AP 103 based on the infrastructure connection information has been successfully established. The cause of failure to perform communication between the information processing apparatus 102 and the communication apparatus 101 even after the connection has been successfully established is, for example, the privacy separator function enabled in the AP 103. Other possible causes of the communication failure include a connection failure between the information processing apparatus 102 and the AP 103, and a connection of the information processing apparatus 102 with another AP 103 different from the AP 103 which the communication apparatus 101 is connected with. A status code c-1 is information indicating that the establishment of the connection between the communication apparatus 101 and the AP 103 based on the infrastructure connection information has failed. Possible causes of the failure to establish the connection include the excessively low radio field intensity in the communication between the communication apparatus 101 and the AP 103 and too many noise radio waves around the communication apparatus 101. Another possible cause of the failure to establish the connection also include the wrong content of the infrastructure connection information transmitted from the information processing apparatus 102 (e.g., the password set in the connection target AP 103 does not coincide with the password included in the infrastructure connection information). A status code c-2 is information indicating that, although the connection between the communication apparatus 101 and the AP 103 based on the infrastructure connection information has been successfully established, the radio field intensity in the communication between the communication apparatus 101 and the AP 103 is low. According to the present exemplary embodiment, the radio field intensity specifically refers to the receiving intensity of the radio wave received from the AP 103 by the communication apparatus 101. A status code c-3 is information indicating that the connection between the communication apparatus 101 and the AP 103 based on the infrastructure connection information has been successfully established but there are many noise radio waves (noise and interference waves) around the communication apparatus 101.

Figure 4:
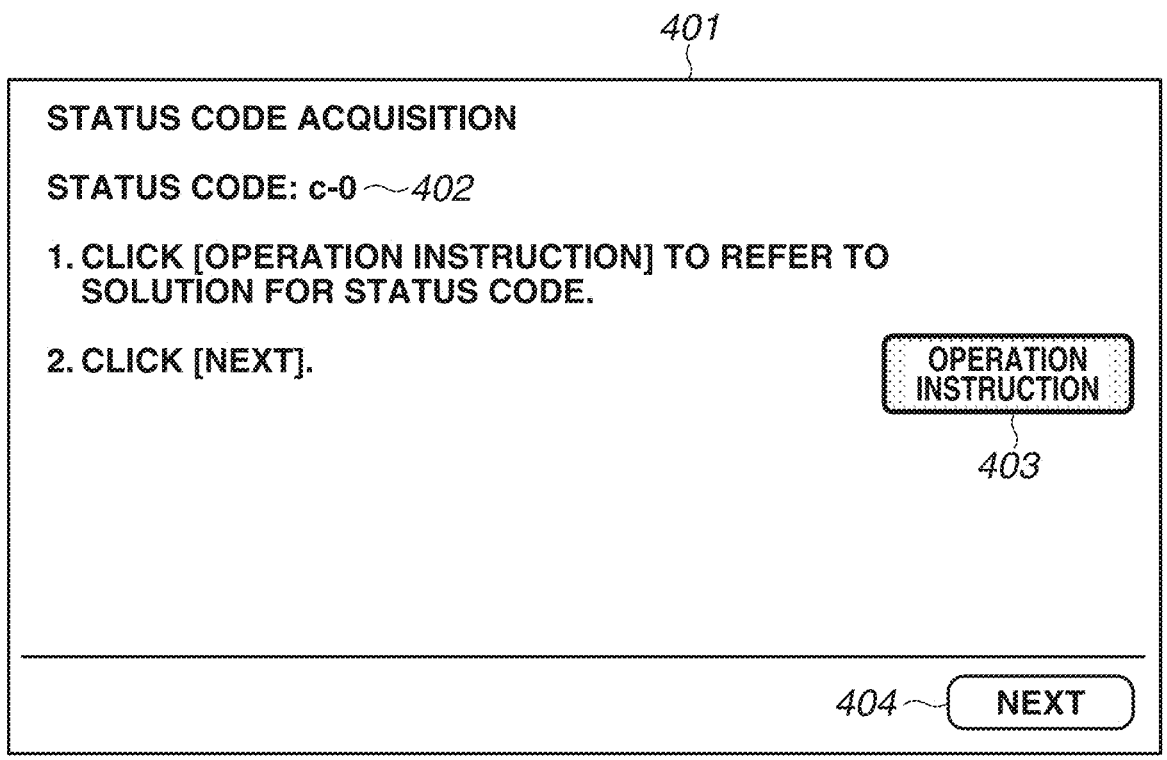
FIG. 4 illustrates an example of a notification screen according to one embodiment.

In step S311, based on the status code received in step S310, the CPU 203 notifies of the cause of failure to perform communication between the information processing apparatus 102 and the communication apparatus 101 even after the communication of the infrastructure connection information has been performed. More specifically, the CPU 203 displays a notification screen 401 illustrated in FIG. 4 on the display unit 208. An area 402 displays the status code received in step S310. More specifically, the content to be displayed in the area 402 depends on the status code received in step S310. An area 403 is used to display a help screen for solving the communication error caused by a factor corresponding to the status code displayed in the area 402 by using the web browser of the information processing apparatus 102. When the area 403 is pressed, the CPU 203 accesses the Internet via the AP 103 by using the Uniform Resource Locator (URL) for displaying the help screen, and the help screen is then displayed by the web browser. To access the Internet, the CPU 203 needs to restore the connection state of the information processing apparatus 102 to the state before the establishment of the direct connection between the communication apparatus 101 operating in the connection setting mode and the information processing apparatus 102. Although, in the present exemplary embodiment, the CPU 203 performs processing for restoring the connection state of the information processing apparatus 102 before displaying the notification screen 401, the configuration is not limited thereto. For example, the processing may be performed when the area 403 is pressed. According to the present exemplary embodiment, methods for solving communication errors corresponding to the status codes c-0 to c-3 are collectively listed on the help screen. By finding the method corresponding to the status code displayed in the notification screen 401 from the list of methods displayed on the help screen, the user can identify and recognize a method for solving the current communication error. Although, in the present exemplary embodiment, the notification screen 401 includes both the area for indicating the current communication error and the area for indicating the method for solving the communication error, embodiments of the present disclosure are not limited thereto. The notification screen 401 includes at least either one of these areas.

In other words, according to the present exemplary embodiment, the same help screen is displayed when the area 403 is pressed, regardless of the status code received in step S310. Referring to the status code displayed in the area 402 in the help screen, the user can find the area describing the method for solving the communication error corresponding to the status code displayed in the area 402. However, the method for notification is not limited thereto. For example, when the area 403 is pressed, different help screens may be displayed depending on the status code received in step S310. For example, the method for solving the communication error corresponding to the status code received in step S310 may be displayed not on the help screen displayed by the web browser but on a screen displayed by the setup application (e.g., the notification screen 401). An area 404 is used to receive an instruction for re-executing the search for the communication apparatus 101. When the area 404 is pressed, the processing proceeds to step S318.

Figure 7:
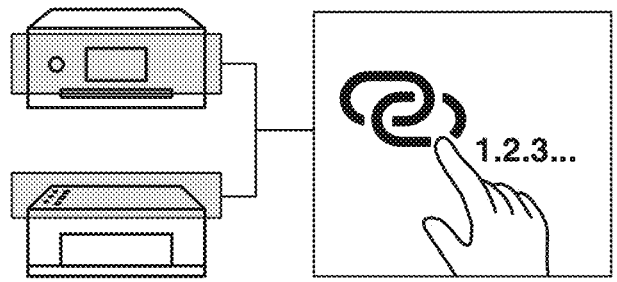
FIG. 7 illustrates an example of an instruction screen according to one embodiment.

In step S312 performed when the result of the determination in step S309 is "NO", the CPU 203 performs processing for promoting the user to perform the operation for operating the communication apparatus 101 in the connection setting mode. More specifically, for example, the CPU 203 displays an instruction screen 701 illustrated in FIG. 7 on the display unit 208. According to the guidance on the instruction screen 701, the user performs the operation for operating the communication apparatus 101 in the connection setting mode. When the instruction screen 701 is displayed on the display unit 208, the CPU 203 starts attempting to establish a connection between the communication apparatus 101 operating in the connection setting mode and the information processing apparatus 102. An area 702 on the instruction screen 701 is a button for canceling (aborting) the connection setting processing.

In step S313, the CPU 203 attempts to establish a connection between the communication apparatus 101 operating in the connection setting mode and the information processing apparatus 102. In a case where the user performs the operation for operating the communication apparatus 101 in the connection setting mode, the connection between the communication apparatus 101 operating in the connection setting mode and the information processing apparatus 102 is established.

In step S314, the CPU 203 determines whether the connection between the communication apparatus 101 operating in the connection setting mode and the information processing apparatus 102 has been successfully established. When the area 702 is pressed before the establishment of the connection between the communication apparatus 101 operating in the connection setting mode and the information processing apparatus 102, the CPU 203 stops attempting to establish a connection between the communication apparatus 101 operating in the connection setting mode and the information processing apparatus 102. In other words, when the area 702 is pressed before the establishment of the connection between the communication apparatus 101 operating in the connection setting mode and the information processing apparatus 102, the establishment of the connection between the communication apparatus 101 operating in the connection setting mode and the information processing apparatus 102 fails. In a case where the CPU 203 determines that the connection has been successfully established (YES in step S314), the processing proceeds to step S315. On the other hand, in a case where the CPU 203 determines that the connection has failed (NO in step S314), the processing proceeds to step S317. In a case where the direct connection attempted in step S313 has been successfully established, the communication between the communication apparatus 101 and the information processing apparatus 102 in step S315 (described below) is performed through the established direct connection.

In step S315 performed when the result of the determination in step S314 is "YES", the CPU 203 transmits a status code request to the communication apparatus 101 and then receives a status code from the communication apparatus 101. This processing is similar to the processing in step S310.

In step S316, based on the status code received in step S315, the CPU 203 issues a notification about the cause of failure to perform communication between the information processing apparatus 102 and the communication apparatus 101 even after the communication of the infrastructure connection information has been performed. This processing is similar to the processing in step S311.

Figure 5:
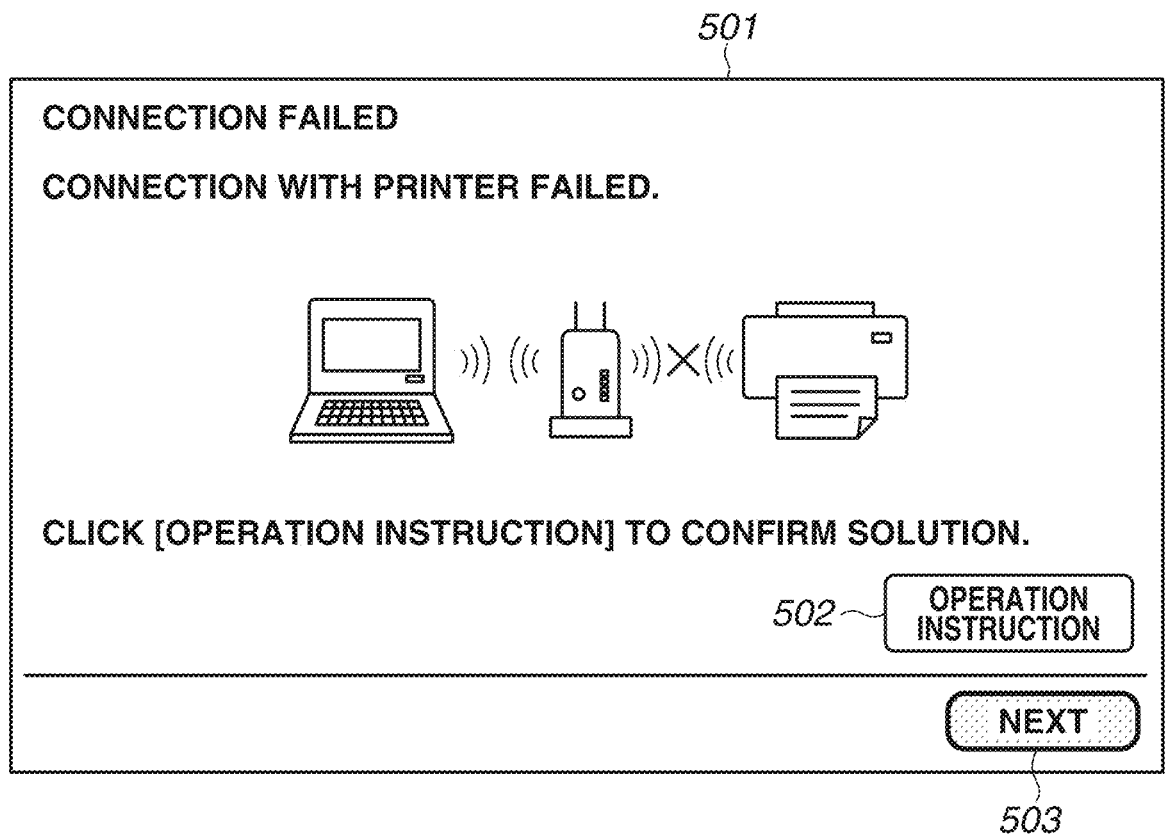
FIG. 5 illustrates an example of an error notification screen for notifying that communication has failed according to one embodiment.
Figure 8:
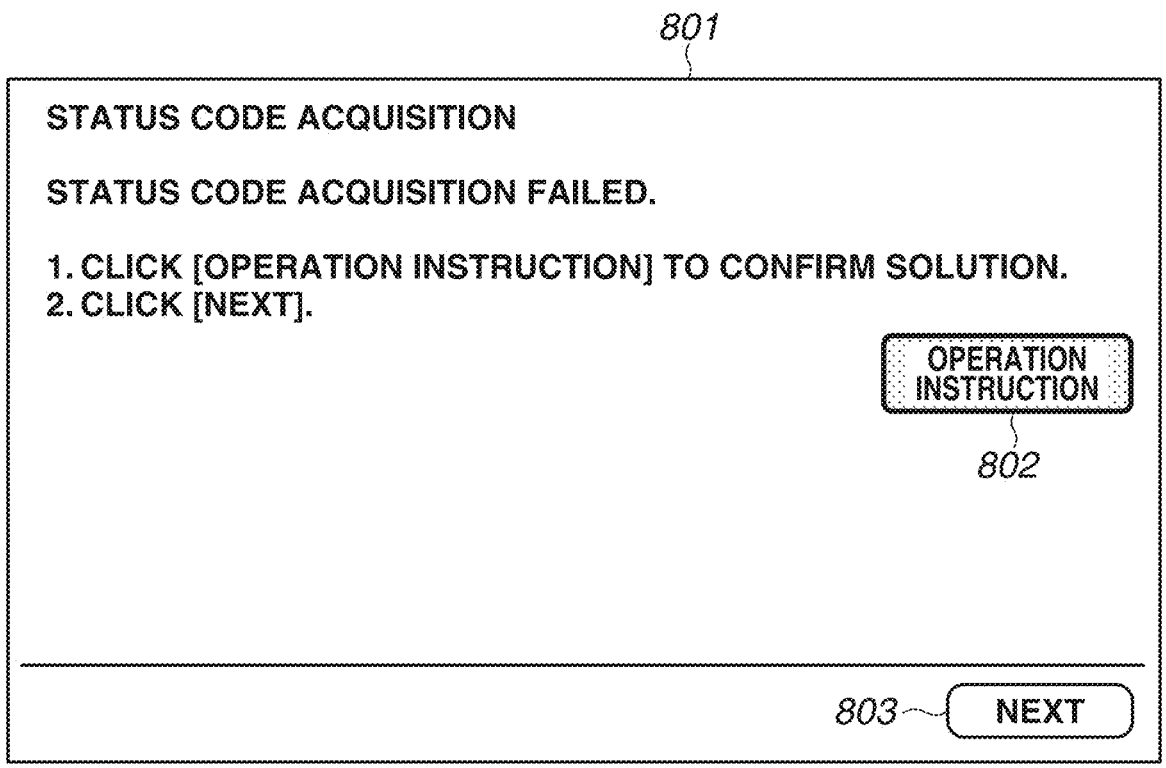
FIG. 8 illustrates an example of an error notification screen for notifying that status code acquisition has failed according to one embodiment.

In step S317 performed when the result of the determination in step S314 is "NO", the CPU 203 performs error notification processing for notifying that the status code acquisition has failed. More specifically, for example, the CPU 203 displays an error notification screen 801 illustrated in FIG. 8 on the display unit 208. The area 802 is used to display a help screen for indicating processing for status code confirmation to the user by using the web browser of the information processing apparatus 102. When an area 502 in FIG. 5 is pressed, the information processing apparatus 102 accesses the Internet via the AP 103 by using the URL, and the help screen is thereby displayed. The help screen includes an area for presenting operating procedures for instructing the communication apparatus 101 to output the status code, by operating the communication apparatus 101. In other words, the error notification screen is a screen for prompting the user to instruct the communication apparatus 101 to output the status code. Specific examples of outputting the status code from the communication apparatus 101 include printing the status code by the communication apparatus 101 and displaying the status code by the display unit (not illustrated) of the communication apparatus 101. An area for presenting operating procedures for instructing the communication apparatus 101 to output the status code may be displayed not on the help screen displayed by the web browser but on a screen displayed by the setup application (e.g., the error notification screen 801). When an area 803 is pressed, the processing of the flowchart is ended.

In step S318 performed after steps S311 and S316, the CPU 203 determines whether the communication with the communication apparatus 101 is executable. This processing is similar to the processing in step S307. When the CPU 203 determines that the communication with the communication apparatus 101 is executable (YES in step S318), the processing proceeds to step S320. On the other hand, when the CPU 203 determines that the communication with the communication apparatus 101 is not executable (NO in step S318), the processing proceeds to step S319.

In step S319 performed when the result of the determination in step S318 is "NO", the CPU 203 performs error notification processing indicating the connection and communication failures between the communication apparatus 101 and the information processing apparatus 102 via the AP 103. More specifically, for example, the CPU 203 displays an error notification screen 501 as illustrated in FIG. 5 on the display unit 208. The area 502 is used to display a help screen for indicating processing for status code confirmation to the user by using the web browser of the information processing apparatus 102. The help screen displayed when the area 502 is pressed is similar to the help screen displayed when the area 802 is pressed. The area describing operating procedures for instructing the communication apparatus 101 to output the status code may be displayed not on the help screen displayed by the web browser but on a screen displayed by the setup application (e.g., the error notification screen 501). When the area 503 is pressed, the processing of this flowchart is ended.

When the result of the determination in step S307 is "YES" or when the result of the determination in step S318 is "YES", the processing proceeds to step S320. In step S320, the CPU 203 receives information about the radio wave state (radio wave state information) from the communication apparatus 101. The radio wave state information includes, for example, information about the radio field intensity in the communication between the communication apparatus 101 and the AP 103. The information about the radio field intensity specifically refers to information about the receiving intensity of the radio wave received from the AP 103 by the communication apparatus 101. The radio wave state information includes, for example, information about noise radio waves around the communication apparatus 101. According to the present exemplary embodiment, the information about noise radio waves is a value of a Signal to Noise Ratio (SNR) measured by the communication apparatus 101.

In step S321, based on the radio wave state information received in step S320, the CPU 203 determines whether the radio field intensity in the communication between the communication apparatus 101 and the AP 103 is equal to or larger than a predetermined threshold value. When the CPU 203 determines that the radio field intensity is equal to or larger than the predetermined threshold value (YES in step S321), the processing proceeds to step S323. On the other hand, when the CPU 203 determines that the radio field intensity is less than the predetermined threshold value (NO in step S321), the processing proceeds to step S322. In step S321, the CPU 203 may further determine whether the radio field intensity in the communication between the information processing apparatus 102 and the AP 103 is equal to or larger than a predetermined threshold value. In this case, when the results of both determinations are "YES", the processing proceeds to step S323. On the other hand, when the result of at least one of the determinations is "NO", the processing proceeds to step S322.

Figure 9:
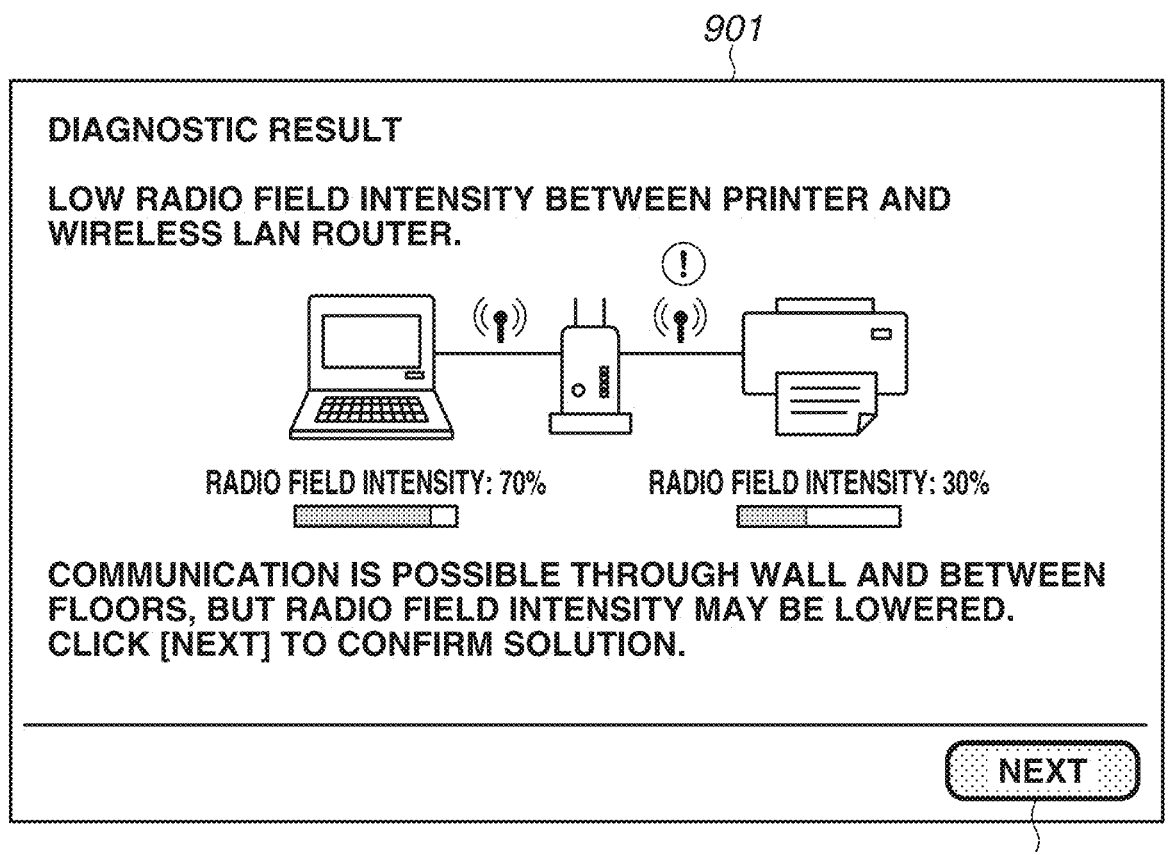
FIG. 9 illustrates an example of an error notification screen for notifying of a radio field intensity error according to one embodiment.

In step S322 performed when the result of the determination in step S321 is "NO", the CPU 203 performs processing for notifying of a radio field intensity error. More specifically, for example, the CPU 203 displays an error notification screen 901 illustrated in FIG. 9 on the display unit 208. The error notification screen 901 may include, for example, a value related to the radio field intensity in the communication between the communication apparatus 101 and the AP 103, and a value related to the radio field intensity in the communication between the information processing apparatus 102 and the AP 103. Subsequently, when an area 902 is pressed, the CPU 203 performs the processing in step S321 again.

In step S323 performed when the result of the determination in step S321 is "YES", the CPU 203 determines whether the intensity of noise radio waves (SNR) in the communication between the communication apparatus 101 and the AP 103 is equal to or less than a predetermined threshold value, based on the radio wave state information received in step S320. When the CPU 203 determines that the intensity of noise radio waves (SNR) in the communication between the communication apparatus 101 and the AP 103 is equal to or less than the predetermined threshold value (YES in step S323), the processing of this flowchart is ended without notifying the user of the error. On the other hand, when the CPU 203 determines that the intensity of noise radio waves in the communication between the communication apparatus 101 and the AP 103 is higher than the predetermined threshold value (NO in step S323), the processing proceeds to step S324. In step S321, the CPU 203 may further determine whether the intensity of noise radio waves in the communication between the information processing apparatus 102 and the AP 103 is equal to or lower than a predetermined threshold value. In this case, when the results of both determinations are "YES", the processing of this flowchart is ended without notifying the user of the error. On the other hand, when the result of at least one of the determinations is "NO", the processing proceeds to step S324.

Figure 10:
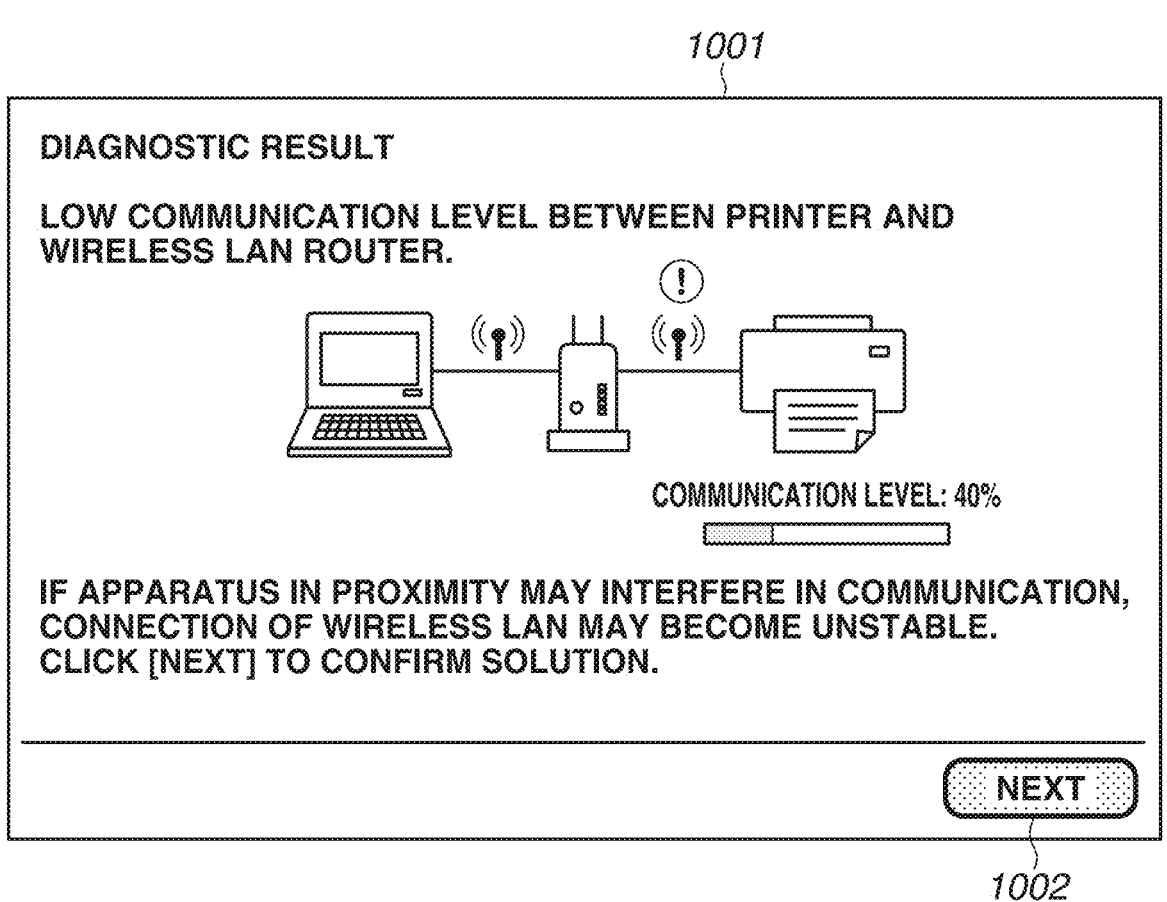
FIG. 10 illustrates an example of an error notification screen for notifying of a noise radio wave error according to one embodiment.

In step S324 performed when the result of the determination in step S323 is "NO", the CPU 203 performs processing for notifying of a noise radio wave error. More specifically, for example, the CPU 203 displays an error notification screen 1001 illustrated in FIG. 10 on the display unit 208. The error notification screen 1001 may include, for example, a value related to the intensity of noise radio waves in the communication between the communication apparatus 101 and the AP 103, and a value related to the intensity of noise radio waves in the communication between the information processing apparatus 102 and the AP 103. Subsequently, when an area 1002 is pressed, the CPU 203 performs the processing in step S321 (or S323) again.

Figure 6:
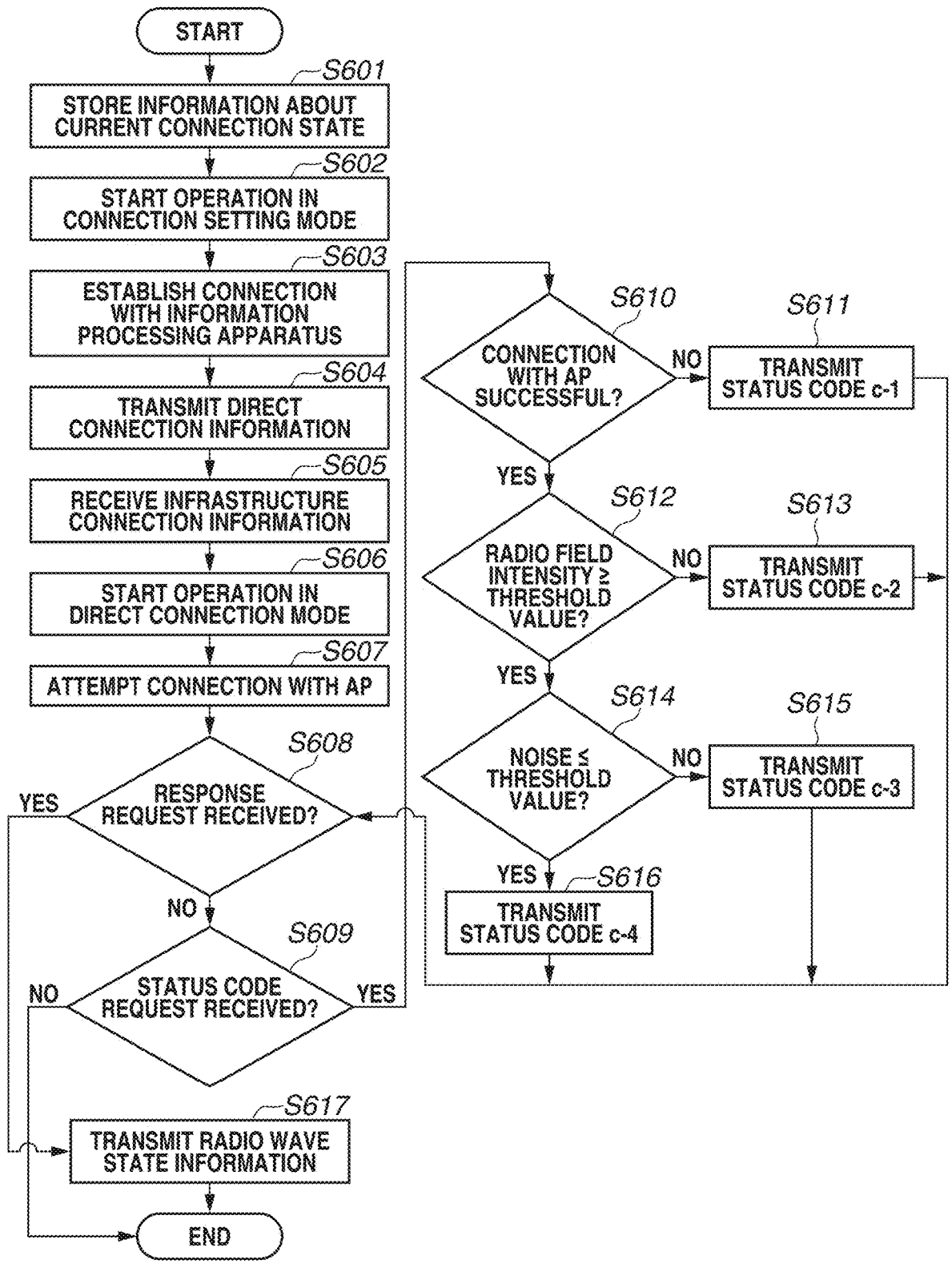
FIG. 6 is a flowchart illustrating connection setting processing performed by the communication apparatus according to one embodiment.

FIG. 6 is a flowchart illustrating the connection setting processing performed by the communication apparatus 101. Processing of this flowchart is implemented when the CPU 255 loads the setup program stored in the ROM 254 into the RAM 253 and then executes the program. This flowchart will be described below centering on a configuration for performing the connection setting processing via the Wi-Fi® communication. This flowchart is started when the communication apparatus 101 is triggered to start the operation in the connection setting mode.

In step S601, the CPU 255 stores information about the current connection state of the communication apparatus 101 (more specifically, information about the connection state when the information processing apparatus 102 receives the instruction for performing the connection setting processing) in a memory such as the ROM 254. In a case where the communication apparatus 101 is connected with any AP 103 when the communication apparatus 101 is triggered to start the operation in the connection setting mode, the connection state information refers to information (SSID and password) about the AP 103 which the communication apparatus 101 is connected with. In a case where the communication apparatus 101 is connected with none of the APs 103 when the communication apparatus 101 is triggered to start the operation in the connection setting mode, the connection state information refers to information indicating that the communication apparatus 101 is connected with none of the APs 103.

In step S602, the CPU 255 causes the communication apparatus 101 to operate in the connection setting mode.

In step S603, the CPU 255 receives a connection request from the information processing apparatus 102 and then establishes a direct connection between the communication apparatus 101 and the information processing apparatus 102. The communication between the communication apparatus 101 and the information processing apparatus 102 in steps S604 and S605 (described below) performed through the established direct connection.

In step S604, the CPU 255 transmits various information to the information processing apparatus 102. Examples of the information transmitted here include the direct connection information and the identification information about the communication apparatus 101. In this case, the CPU 255 may search for APs 103 existing around the communication apparatus 101 and then transmit a list of APs 103 found in the search to the information processing apparatus 102.

In step S605, the CPU 255 receives the infrastructure connection information from the information processing apparatus 102.

in step S606, the CPU 255 causes the communication apparatus 101 to operate in the direct connection mode. At this time, the communicate mode of the communication apparatus 101 is changed, and therefore the direct connection established in step S603 is disconnected.

In step S607, the CPU 255 attempts to establish a connection between the AP 103 and the communication apparatus 101 based on the infrastructure connection information received in step S605. As described above, even after this processing has been performed, the establishment of the connection between the AP 103 and the communication apparatus 101 may fail for various reasons. In addition, the communication with the information processing apparatus 102 may fail even after the connection between the AP 103 and the communication apparatus 101 has been successfully established. Since the communication apparatus 101 has already been operating in the direct connection mode, the communication apparatus 101 starts the simultaneous operation when the communication apparatus 101 is connected with the AP 103.

In step S608, the CPU 255 determines whether a response request broadcasted from the information processing apparatus 102 via the AP 103 is received. The response request is not received in a case of failure to establish a connection between the AP 103 and the communication apparatus 101. When the CPU 255 determines that a response request is received (YES in step S608), the CPU 255 transmits a response to the information processing apparatus 102. Then, the processing proceeds to step S617. On the other hand, when the CPU 255 determines that a response request is not received (NO in step S608), the processing proceeds to step S609.

In step S609 performed when the result of the determination in step S608 is "NO", the CPU 255 determines whether the status code request is received from the information processing apparatus 102. The status code request is received via the connection between the communication apparatus 101 operating in the direct connection mode and the information processing apparatus 102. There is a case where, before the determination in step S608 is performed, an operation for causing the communication apparatus 101 to operate in the connection setting mode has been received, and the connection between the communication apparatus 101 operating in the connection setting mode and the information processing apparatus 102 has been established. In this case, the status code request is received via the connection between the communication apparatus 101 operating in the connection setting mode and the information processing apparatus 102. When the CPU 255 determines that the status code request is received from the information processing apparatus 102 (YES in step S609), the processing proceeds to step S610. On the other hand, when the CPU 255 determines that the status code request is not received from the information processing apparatus 102 (NO in step S609), the processing of this flowchart is ended.

In step S610 performed when the result of the determination in step S609 is "YES", the CPU 255 determines whether the connection between the AP 103 and the communication apparatus 101 has been successfully established in step S607. When the CPU 203 determines that the connection between the AP 103 and the communication apparatus 101 has been successfully established (YES in step S610), the processing proceeds to step S612. On the other hand, when the CPU 203 determines that the establishment of the connection between the AP 103 and the communication apparatus 101 has failed (NO in step S610), the processing proceeds to step S611.

In step S611 performed when the result of the determination in step S610 is "NO", the CPU 255 transmits the status code c-1 to the information processing apparatus 102. Then, the CPU 255 performs step S608 again.

In step S612 performed when the result of the determination in step S610 is "YES", the CPU 255 determines whether the radio field intensity in the communication between the communication apparatus 101 and the AP 103 is equal to or larger than a predetermined threshold value. When the CPU 255 determines that the radio field intensity is equal to or larger than the predetermined threshold value (YES in step S612), the processing proceeds to step S614. On the other hand, when the CPU 255 determines the radio field intensity is less than the predetermined threshold value (NO in step S612), the processing proceeds to step S613.

In step S613 performed when the result of the determination in step S612 is "NO", the CPU 255 transmits the status code c-2 to the information processing apparatus 102. In this step, the CPU 255 may transmit a value indicating the radio field intensity in the communication between the communication apparatus 101 and the AP 103 to the information processing apparatus 102. Then, the CPU 255 performs step S608 again.

In step S614 performed when the result of the determination in step S612 is "YES", the CPU 255 determines whether the intensity of noise radio waves in the communication between the communication apparatus 101 and the AP 103 is equal to or lower than a predetermined threshold value. When the CPU 203 determines that the intensity of noise radio waves is equal to or lower than the predetermined threshold value (YES in step S614), the processing proceeds to step S616. On the other hand, when the CPU 203 determines that the intensity of noise radio waves is higher than the predetermined threshold value (NO in step S614), the processing proceeds to step S615.

In step S615 performed when the result of the determination in step S614 is "NO", the CPU 255 transmits the status code c-3 to the information processing apparatus 102. In this step, the CPU 255 may transmit a value indicating the intensity of noise radio waves in the communication between the communication apparatus 101 and the AP 103 to the information processing apparatus 102. Then, the CPU 255 performs step S608 again.

In step S616 performed when the result of the determination in step S614 is "YES", the CPU 255 transmits the status code c-0 to the information processing apparatus 102. Then, the CPU 255 performs step S608 again.

In step S617 performed when the result of the determination in step S608 is "YES", the CPU 255 measures the radio wave state of the communication apparatus 101 and then transmits the radio wave state information to the information processing apparatus 102 via the AP 103. Then, the processing of this flowchart is ended.

In a case where the communication apparatus 101 receives a status code output operation from the user, the communication apparatus 101 outputs (prints and displays) the status code.

In a case of failure to perform communication between the information processing apparatus 102 and the communication apparatus 101 even after the information processing apparatus 102 has performed the connection setting processing, the cause of the communication failure can be appropriately notified to the user.

After the connection setting is completed by this processing and the communication between the information processing apparatus 102 and the communication apparatus 101 via the AP 103 is enabled, the information processing apparatus 102 can communicate with the communication apparatus 101 as appropriate. More specifically, for example, the information processing apparatus 102 can transmit a print job or a scan job to the communication apparatus 101 and acquire the status of the communication apparatus 101.

OTHER EXEMPLARY EMBODIMENTS

Although a configuration of performing the connection setting processing through the communication via the Wi-Fi®-based connection has been described above, embodiments of the present disclosure are not limited thereto. For example, the connection setting processing may be performed (i.e., the infrastructure connection information may be transmitted) through the communication via the BLE-based connection. In a case where the connection setting processing is performed via the BLE-based connection, the BLE-based connection between the communication apparatus 101 and the information processing apparatus 102 may be maintained after the infrastructure connection information has been transmitted. Then, the status code acquisition may be performed via the maintained BLE-based connection. Accordingly, in a case where the connection setting processing is performed through the communication via the BLE-based connection, for example, the communication of the direct connection information and the transition to the direct connection mode after the communication of the infrastructure connection information do not need to be performed. In addition, a new connection between the communication apparatus 101 operating in the direct connection mode and the information processing apparatus 102 does not need to be established. Further, in a case where the communication apparatus 101 and the information processing apparatus 102 can perform both the connection setting processing by the BLE communication and the connection setting processing by the Wi-Fi® communication, for example, processing being executed in the connection setting processing may be changed depending on in which method the connection setting processing is performed. More specifically, the communication apparatus 101 may determine whether to perform communication of the infrastructure connection information and the transition to the direct connection mode after the communication of the direct connection information. In addition, the information processing apparatus 102 may determine whether to perform communication of the direct connection information and attempt to perform the connection with the communication apparatus 101 operating in the direct connection mode, and which communication method is used to acquire the status code.

Embodiments of the present disclosure can also be achieved when a program for implementing at least one of the functions according to the above-described exemplary embodiments is supplied to a system or apparatus via a network or storage medium, and a computer of the system or apparatus reads and executes the program. The computer can have one or a plurality of processors or circuits, and include a network of a plurality of separated computers or a plurality of separated processors or circuits in order to read and execute computer-executable instructions.

Embodiments of the present disclosure enable a user, in a case of failure to perform communication between a communication apparatus and an information processing apparatus via an external apparatus even after information about the external apparatus has been transmitted to the communication apparatus, to recognize measures to be taken to solve the cause of a failure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While exemplary embodiments of the present disclosure have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-139167, filed Jul. 29, 2019, which is hereby incorporated by reference herein in its entirety.

What is claimed is:

1. A method for an information processing apparatus, the method comprising:
transmitting, to a communication apparatus, connection information for connecting to an external apparatus, the external apparatus being separate from and external to both the communication apparatus and the information processing apparatus;
after transmitting the connection information to the communication apparatus, determining, whether communication between the communication apparatus and the information processing apparatus via the external apparatus is executable; and
performing, in a case where communication between the communication apparatus and the information processing apparatus via the external apparatus is determined to be inexecutable, communication failure processing comprising:
establishing a new connection between the communication apparatus and the information processing apparatus, the new connection not involving communication via the external apparatus;
acquiring, from the communication apparatus via the new connection, information relating to a communication error making communication between the communication apparatus and the information processing apparatus via the external apparatus inexecutable; and then
performing notification processing including:
(i) providing a user with information that could assist in determining a solution to the communication error, based on the information relating to the communication error acquired via the new connection, by displaying a screen that:
provides a description of a cause of the communication error, and/or
provides a mechanism for accessing information that could be used to determine a cause of the communication error, and/or
(ii) providing the user with a description of a process for solving the communication error, the process determined based on the information relating to the communication error acquired via the new connection.

2. The method according to claim 1,
wherein, in a case where the communication between the communication apparatus and the information processing apparatus via the external apparatus is determined to be inexecutable, the new connection that is established is a connection between the communication apparatus operating in a first mode enabling connection based on first connection information and the information processing apparatus, the new connection not involving communication via the external apparatus, and
wherein, in a case of failure to establish the new connection between the communication apparatus operating in the first mode and the information processing apparatus, an attempt is made to establish a second new connection between the communication apparatus operating in a second mode enabling connection based on second connection information and the information processing apparatus, the second new connection not involving communication via the external apparatus.

3. The method according to claim 2, further comprising executing processing for causing the communication apparatus to operate in the second mode in a case of failure to establish the new connection between the communication apparatus operating in the first mode and the information processing apparatus, the new connection not involving communication via the external apparatus.

4. The method according to claim 2, further comprising executing processing for causing the communication apparatus to output the information about the communication error in a case of failure to establish the second new connection between the communication apparatus operating in the second mode and the information processing apparatus, the second new connection not involving communication via the external apparatus.

5. The method according to claim 4, wherein the processing for causing the communication apparatus to output the information about the communication error is processing for displaying on a display unit a button for displaying a screen indicating a method for causing the communication apparatus to output the information about the communication error, by using a web browser.

6. The method according to claim 4, wherein the processing in which the communication apparatus outputs the information about the communication error is at least one of processing in which the communication apparatus prints the information about the communication error, and processing in which a display unit included in the communication apparatus displays the information about the communication error.

7. The method according to claim 4, further comprising:
executing error notification processing different from the notification processing in the case of failure to establish the second new connection between the communication apparatus operating in the second mode and the information processing apparatus, the second new connection not involving communication via the external apparatus.

8. The method according to claim 4, further comprising:
acquiring, from the communication apparatus via the second new connection between the communication apparatus operating in the second mode and the information processing apparatus, the second new connection not involving communication via the external apparatus, the information relating to the communication error, in a case of success in establishing the connection between the communication apparatus operating in the second mode and the information processing apparatus without using communication via the external apparatus.

9. The method according to claim 2, wherein the transmission of the connection information is performed via the second new connection between the communication apparatus operating in the second mode and the information processing apparatus, the second new connection not involving communication via the external apparatus.

10. The method according to claim 1, wherein, in a case where the connection information is transmitted to the communication apparatus based on a first communication method and the communication between the communication apparatus and the information processing apparatus via the external apparatus is determined to be inexecutable, the new connection is established, and
wherein, in a case where the connection information is transmitted to the communication apparatus based on a second communication method and the communication between the communication apparatus and the information processing apparatus via the external apparatus is determined to be inexecutable, the new connection is not established.

11. The method according to claim 10, wherein, in a case where the connection information is transmitted to the communication apparatus based on the first communication method and the communication between the communication apparatus and the information processing apparatus via the external apparatus is determined to be inexecutable, the information about the communication error is acquired via the new connection established based on the first communication method, and
wherein, in a case where the connection information is transmitted to the communication apparatus based on the second communication method and the communication between the communication apparatus and the information processing apparatus via the external apparatus is determined to be inexecutable, the information about the communication error is acquired via a second new connection established between the communication apparatus and the information processing apparatus based on the second communication method, the second new connection not involving communication via the external apparatus.

12. The method according to claim 10, wherein the first communication method is Wireless Fidelity (Wi-Fi), and
wherein the second communication method is Bluetooth.

13. The method according to claim 12, wherein the second communication method is Bluetooth Low Energy.

14. The method according to claim 1, wherein the information about the communication error includes at least one of information about whether the connection between the communication apparatus and the external apparatus was successfully established based on the connection information, information about a receiving intensity of radio waves received from the external apparatus by the communication apparatus, or information about noise radio waves around the communication apparatus.

15. The method according to claim 1, wherein the notification processing includes processing for displaying the information about the communication error on a display unit.

16. The method according to claim 1, wherein the notification processing includes processing for displaying a help screen indicating a list of methods for solving one or more communication errors, and
wherein the information about the communication error acquired from the communication apparatus is used for identifying a method for solving the communication error that has currently occurred in the communication between the communication apparatus and the information processing apparatus from among the list of methods indicated by the help screen.

17. The method according to claim 16, wherein the processing for displaying the help screen is processing for displaying on a display unit a button for displaying the help screen by using a web browser.

18. The method according to claim 1, wherein, in a case where the communication between the communication apparatus and the information processing apparatus via the external apparatus is determined to be executable, it is determined whether a receiving intensity of radio waves received from the external apparatus by the communication apparatus is equal to or larger than a threshold value, and
wherein, in a case where the receiving intensity of radio waves received from the external apparatus by the communication apparatus is determined to be less than the threshold value, processing for notifying the user that the receiving intensity of radio waves received from the external apparatus by the communication apparatus is low is executed.

19. The method according to claim 18, wherein, in the case where the communication between the communication apparatus and the information processing apparatus via the external apparatus is determined to be executable, it is determined whether the receiving intensity of radio waves received from the external apparatus by the communication apparatus is equal to or larger than the threshold value and whether a receiving intensity of radio waves received from the external apparatus by the information processing apparatus is equal to or larger than a threshold value, and
wherein, in the case where the receiving intensity of radio waves received from the external apparatus by the communication apparatus is determined to be less than the threshold value, the processing for notifying the user that the receiving intensity of radio waves received from the external apparatus by the communication apparatus is low is executed, and
wherein, in a case where the receiving intensity of radio waves received from the external apparatus by the information processing apparatus is determined to be less than the threshold value, processing for notifying the user that the receiving intensity of radio waves received from the external apparatus by the information processing apparatus is low is executed.

20. The method according to claim 1, wherein, in a case where the communication between the communication apparatus and the information processing apparatus via the external apparatus is determined to be executable, it is determined whether an intensity of noise radio waves around the communication apparatus is equal to or less than a threshold value, and wherein, in a case where the intensity of noise radio waves around the communication apparatus is determined to be larger than the threshold value, processing for notifying the user that there are many noise radio waves around the communication apparatus is performed.

21. The method according to claim 20,
wherein, in the case where the communication between the communication apparatus and the information processing apparatus via the external apparatus is determined to be executable, it is determined whether the intensity of noise radio waves around the communication apparatus is equal to or less than the threshold value and whether an intensity of noise radio waves around the information processing apparatus is equal to or less than a threshold value, and
wherein, in the case where the intensity of noise radio waves around the communication apparatus is determined to be larger than the threshold value, the processing for notifying the user that there are many noise radio waves around the communication apparatus is performed, and
wherein, in a case where the intensity of noise radio waves around the information processing apparatus is determined to be larger than the threshold value, processing for notifying the user that there are many noise radio waves around the information processing apparatus is performed.

22. The method according to claim 1, wherein the communication error includes at least one of
an error issued when the establishment of the connection between the communication apparatus and the external apparatus based on the connection information fails,
an error issued when, even though the connection between the communication apparatus and the external apparatus based on the connection information has been successfully established, a privacy separator function is set in the external apparatus,
an error issued when, even though the connection between the communication apparatus and the external apparatus based on the connection information has been successfully established, a receiving intensity of radio waves received from the external apparatus by the communication apparatus is low, or
an error issued when, even though the connection between the communication apparatus and the external apparatus based on the connection information has been successfully established, there are many noise radio waves around the communication apparatus.

23. The method according to claim 1, wherein a print job for instructing the communication apparatus to perform printing is transmitted from the information processing apparatus to the communication apparatus through communication between the communication apparatus and the information processing apparatus via the external apparatus.

24. The method according to claim 1, further comprising acquiring, via a first connection between the communication apparatus and the information processing apparatus, the first connection not involving communication via the external apparatus, predetermined information for establishing a second connection that is a connection between the communication apparatus and the information processing apparatus, wherein the second connection does not involve communication via the external apparatus and is different from the first connection; wherein the connection information is transmitted via the first connection, and wherein the new connection is the second connection that was established using the predetermined information.

25. An information processing apparatus comprising:
one or more processors; and
one or more memories storing instructions which, when executed, cause the information processing apparatus to perform operations comprising:
transmitting, to a communication apparatus, connection information for connecting to an external apparatus, the external apparatus being separate from and external to both the communication apparatus and the information processing apparatus;
after transmitting the connection information to the communication apparatus, determining, whether communication between the communication apparatus and the information processing apparatus via the external apparatus is executable; and
performing, in a case where communication between the communication apparatus and the information processing apparatus via the external apparatus is determined to be inexecutable, communication failure processing comprising:
establishing a new connection between the communication apparatus and the information processing apparatus, the new connection not involving communication via the external apparatus;
acquiring, from the communication apparatus via the new connection, information relating to a communication error making communication between the communication apparatus and the information processing apparatus via the external apparatus inexecutable; and then
performing notification processing including:
(i) providing a user with information that could assist in determining a solution to the communication error, based on the information relating to the communication error acquired via the new connection, by displaying a screen that:
provides a description of a cause of the communication error, and/or provides a mechanism for accessing information that could be used to determine a cause of the communication error, and/or
(ii) providing the user with a description of a process for solving the communication error, the process determined based on the information relating to the communication error acquired via the new connection.

26. A non-transitory storage-medium storing instructions for causing a computing device to perform a process for controlling an information processing apparatus, the process comprising:
transmitting, from the information processing apparatus to a communication apparatus, connection information for connecting to an external apparatus, the external apparatus being separate from and external to both the communication apparatus and the information processing apparatus;
after transmitting the connection information to the communication apparatus, determining whether communication between the communication apparatus and the information processing apparatus via the external apparatus is executable; and
performing, in a case where communication between the communication apparatus and the information processing apparatus via the external apparatus is determined to be inexecutable, communication failure processing comprising:

establishing a new connection between the communication apparatus and the information processing apparatus, the new connection not involving communication via the external apparatus;

acquiring, from the communication apparatus via the new connection, information relating to a communication error making communication between the communication apparatus and the information processing apparatus via the external apparatus inexecutable; and then performing notification processing including:

(i) providing a user with information that could assist in determining a solution to the communication error, based on the information relating to the communication error acquired via the new connection, by displaying a screen that:

provides a description of a cause of the communication error, and/or provides a mechanism for accessing information that could be used to determine a cause of the communication error, and/or (ii) providing the user with a description of a process for solving the communication error, the process determined based on the information relating to the communication error acquired via the new connection.

* * * * *